Nov. 15, 1966 H. PILLER 3,285,127
MAGNETICALLY ATTACHED MICROSCOPE ACCESSORY
FOR SUPPORTING COMPARISON OBJECTS
Filed Sept. 28, 1964 2 Sheets-Sheet 1

INVENTOR:
Horst Piller,
BY Singer, Stern &
Carlberg, Attorneys.

Nov. 15, 1966   H. PILLER   3,285,127
MAGNETICALLY ATTACHED MICROSCOPE ACCESSORY
FOR SUPPORTING COMPARISON OBJECTS
Filed Sept. 28, 1964   2 Sheets-Sheet 2
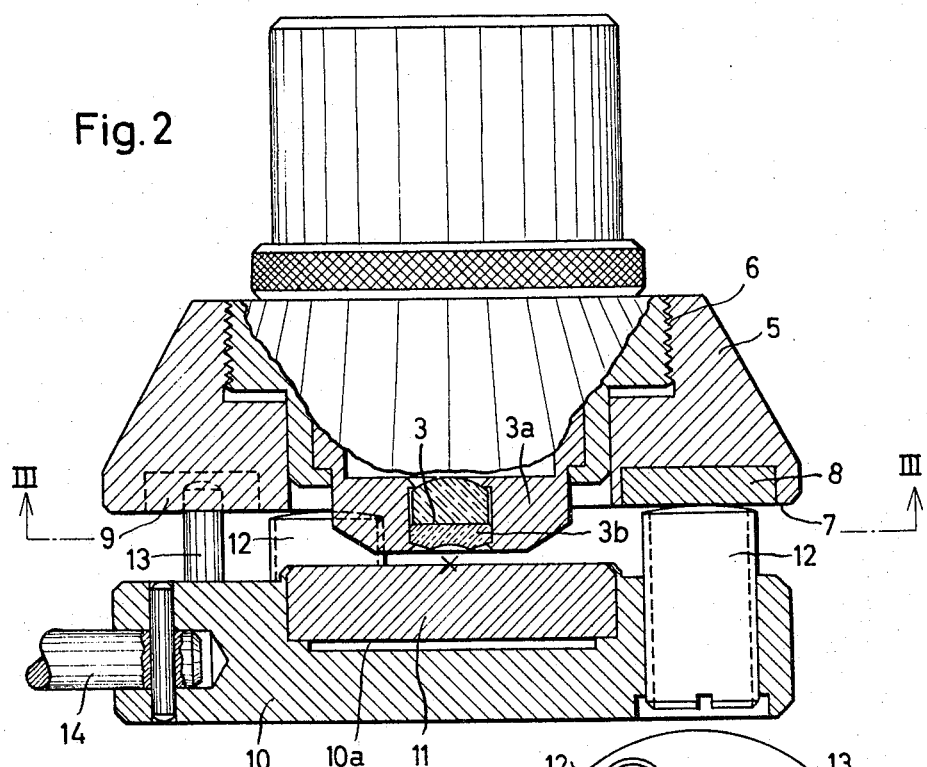
Fig. 2
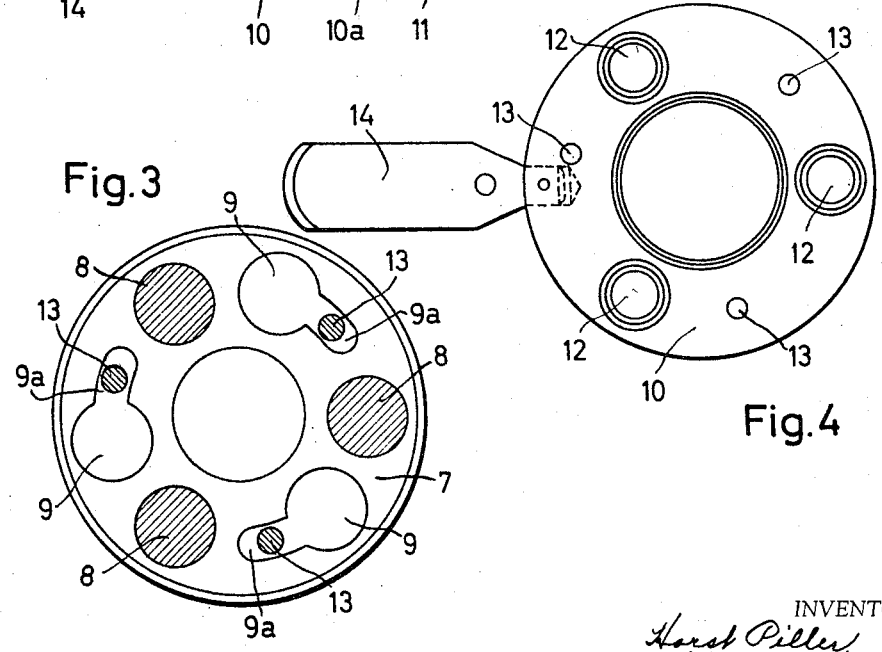
Fig. 3
Fig. 4
INVENTOR:
Horst Piller,
BY Singer, Stern &
Carlburg, Attorneys.

United States Patent Office 3,285,127
Patented Nov. 15, 1966

1

3,285,127
MAGNETICALLY ATTACHED MICROSCOPE ACCESSORY FOR SUPPORTING COMPARISON OBJECTS
Horst Piller, Aalen, Wurttemberg, Germany, assignor to Carl Zeiss-Stiftung, doing business as Carl Zeiss, Heidenheim (Brenz), Wurttemberg, Germany, a corporation of Germany
Filed Sept. 28, 1964, Ser. No. 399,528
Claims priority, application Germany, Oct. 18, 1963, Z 10,419
1 Claim. (Cl. 88—40)

The invention relates a microscope, which is provided with the aid of comparison objects whose deflection capacity can be calculated or precisely ascertained by macroscopic measurements, also microscopic preparations can be measured satisfactorily although, in contrast to macrophotometers, no direct but only indirect methods can be used.

In this measuring method it is desirable that calibration and measurement are carried out under absolutely identical conditions. In particular, it has to be taken care that the measuring values cannot be altered and misrepresented by time variable factors, such as varying reflection capacity of the object caused, for instance, by dust or humidity, changes in the intensity of the light source when the same is not sufficiently stable, or a change of the diaphragm adjustment caused by vibrations. Consequently, a quick and accurate readjustment between calibration and measurement must be possible from time to time with the least manipulation, while the basic adjustment of the instrument and the photometer remains substantialy unchanged.

It is the object of the invention to provide for the aforementioned readjustment between the calibration and measurement in that on the lens support or mount of the objective has adjustably attached thereto a ring having an at least partially ferromagnetic front face, while for the comparison object is provided a carrier or holder having adhesion magnets thereon which permit by adjusting said ring the positioning of the comparison object in the object plane of the microscopic lens. The ferromagnetically effective ring is provided with pin holes and the carrier of the comparison object with correspondingly positioned pins for engaging the pin holes so as to ensure a correct position of the comparison object in the center of the viewing area.

The carrier for the comparison object is provided with a preferably bar-like handle and is so flat that when the object table of the microscope is lowered, or the lens system is raised, respectively, it can be placed between the steadily remaining on the table and the lower end of the lens system.

The invention will now be described by way of example with reference to the accompanying drawings, in which—

FIG. 2 illustrates in an enlarged scale and partly in vertical section the support of the microscope objective having thereon the magnetically attached carrier for a comparison object;

FIG. 3 is a top plan view of the end face view of the attachment ring, and a section along line III—III of FIG. 2, and FIG. 4 is a top plan view of the holder or carrier for the comparison object.

2

Figure 1:
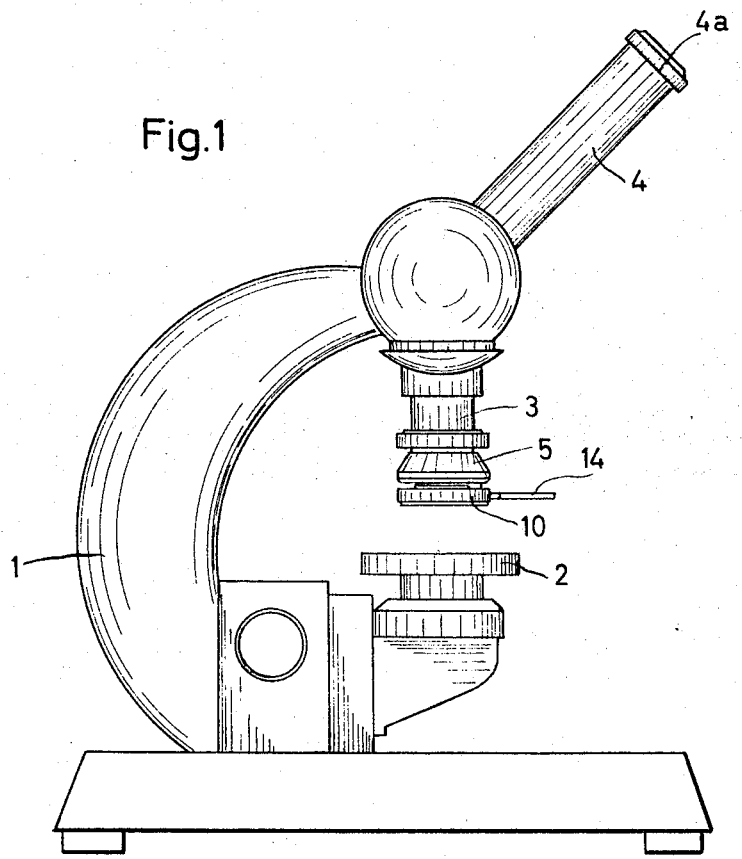
FIG. 1 is a side elevation view of a microscope equipped with the device of the invention.

Referring to FIG. 1, the microscope comprises a vertical curved support 1, a horizontal object table 2 which in conventional manner can be raised and lowered, a tubular structure 4 attached to the upper end of the support 1 and carrying an eyepiece 4a and the objective 3 which is mounted above the table 2 on the upper end of the support 1. Adjustably arranged on the objective support or mount is a ring 5 according to the invention which has magnetically attached thereto the holder or carrier 10 for a comparison object.

FIG. 2 illustrates in an enlarged scale a lens support 3a from the lower end of which protrudes the front lens 3b of the objective 3. On this lens support is threaded, for instance in exchange for the conventional engraved sleeve, the ring 5 the axial distance of which relative to the object plane of the lens 3 is accurately adjustable by means of a threaded connection 6. The downwardly facing front face 7 of the ring 5 has recessed therein ferromagnetic inserts 8 and pin holes 9. The carrier 10 of the comparison object 11 consists of a flat, predominantly cylindrical body which is provided with a central recess 10a for holding the comparison object 11, three threadedly mounted magnets 12, three fixed pins 13, and a bar-like handle 14 radially outwardly extending for facilitating the attachment and removal, respectively, of the holder 10. The comparison object 11 may for example consist of a highly polished metal plate or of a glass plate to which has been applied by vaporization a layer of an exactly known reflection property.

FIG. 3 is a top view of the downwardly facing front face 7 of the ring 5, showing three circumferentially uniformly spaced circular ferromagnetic inserts 8 and therebetween three relatively large pin holes 9 with circumferentially extending slots 9a which, as indicated, are adapted to receive the pins 13 attached to the holder 10.

FIG. 4 is a top plan view of the upper face of the holder 10 illustrating the three magnets 12 and the three pins 13. The handle 14 serves for a convenient attaching and removing, respectively, of the holder 10 in which the comparison object is mounted. This is done by laterally inserting the holder 10 into the space between the object table 2 and the lens system 3, moving the holder upwardly until the pins 13 enter the large portions of the pin holes 9 and the magnets 12 engage the front face 7 of the ring 5, and then rotating the holder 10 about its center so that its pins 13 enter the slots 9a, thereby centering the holder 10 with respect to the lens system 3 and causing the magnets 8 and 12 to move into axial alignment. The removal of the holder with the comparison object thereon takes place in the reverse manner.

What I claim is:

A device for use with a microscope having a stage and an objective mount with an objective, an annular support threadedly connected to said objective mount so as to allow relative movement of the two members axially of the microscope, said annular support having a plurality of circular ferromagnetic inserts situated along its lower face, the inserts all lying within a single plane perpendicular to the axis of said objective and being equi-angularly spaced around the annular support at the same radial distance from the axis of the objective, said annular support also having a plurality of equi-angularly spaced keyhole slots situated within the annular support and at the same radial distance from the axis of said objective, a holder for supporting comparison objects, a plurality of magnetic rods corresponding in number and relative position to the ferromagnetic inserts of the annular support, the magnetic rods having end faces lying in a common plane perpendicular to an optical axis of the holder which coincides with the axis of the microscope when the holder is mounted on the microscope, and a plurality of fixed pins on the holder corresponding in a number and position to the keyhole slots of the support so that rotation of the holder in one direction engages the magnets of the holder with the inserts of the support and at the same time brings the holder into alignment with the optical axis of the microscope, and a rotation of the holder in a reverse direction disengages the magnets.

References Cited by the Examiner

UNITED STATES PATENTS

| | | | |
|---|---|---|---|
| 2,953,970 | 9/1960 | Maynard | 88 |
| 2,977,849 | 4/1961 | Wassel | 88—1 X |

FOREIGN PATENTS 1,199,713  12/1959  France.

OTHER REFERENCES

German printed application V 5,118, October 1955.

JEWELL H. PEDERSEN, *Primary Examiner.*

W. L. SIKES, *Assistant Examiner.*